United States Patent [19]

Spigarelli

[11] Patent Number: 4,720,208
[45] Date of Patent: Jan. 19, 1988

[54] AGGREGATE LEVELING RAKE

[76] Inventor: Anthony M. Spigarelli, 18425 Lakeview Point Dr., Wyoming, Minn. 55092

[21] Appl. No.: 879,047

[22] Filed: Jun. 26, 1986

[51] Int. Cl.$^4$ .............................................. E01C 19/20
[52] U.S. Cl. ...................................... 404/97; 404/101
[58] Field of Search ................ 404/97, 101, 110, 118; 56/400.01, 400.04, 400.07, 400.16, 400.21; 15/235.4; 172/371, 378

[56] References Cited

U.S. PATENT DOCUMENTS

| | | | |
|---|---|---|---|
| 395,721 | 1/1889 | Steiner | 56/400.21 X |
| 1,100,323 | 6/1914 | Ovens | 56/400.21 X |
| 3,225,837 | 12/1965 | Richards | 172/371 |
| 4,070,128 | 1/1978 | Garrison | 404/97 X |
| 4,411,463 | 10/1983 | Alderman | 56/400.21 X |
| 4,414,797 | 11/1983 | Archer | 56/400.01 X |

Primary Examiner—James A. Leppink
Assistant Examiner—Matthew Smith
Attorney, Agent, or Firm—Warren A. Sturm

[57] ABSTRACT

A rake for leveling aggregate, such as one-half to two-inch size aggregate used in roofing or landscaping applications, is comprised of a heavy, rigid, generally vertically disposed frame including a downwardly depending portion extending thereunder for immersion, submersion and movement through a volume of aggregate to be levelled over a flexible membrane. The downwardly depending portion has rounded ends and may be of a symmetrical serpentine shape intermediate the ends.

8 Claims, 7 Drawing Figures

AGGREGATE LEVELING RAKE

BACKGROUND OF THE INVENTION

1. Field of the Invention

My invention relates generally to the processing of coatings of aggregate materials of varying sizes to distribute the aggregate in a level layer or coating over a fragile membrane such as rubber, plastic, or the like.

2. Prior Art

A search for a suitable rake to perform the objects of my invention has failed to disclose a device possessing the desired characteristics. One form of rake that has been attempted for use in performing the leveling of an uneven layer of aggregate material on a surface has been the common asphalt rake typically used in the road construction industry for distributing asphalt over a surface prior to the rolling or compacting operation. Other forms of garden and other special purpose rakes have been tried, but none have provided the novel and unobvious advantages of my invention.

The following is a listing of United States Patents that were collected in the course of a pre-filing search of the records of the U.S. Patent Office, and none of them are considered relevant or pertinent to the objectives provided by my invention:

| U.S. Pat. No. | Patentee | Issue Date |
| --- | --- | --- |
| 2,317,916 | Kallal | April 27, 1943 |
| 4,414,797 | Archer | Nov. 15, 1983 |
| Des.274,118 | Cochrane | June 5, 1984 |
| 4,520,621 | Archer | June 4, 1985 |
| Des.282,621 | Nuorivaara | Feb. 18, 1986 |

Of the above listing patents, the Archer U.S. Pat. No. 4,414,797 includes a raking element of serpentine configuration. However, the purposes and operation thereof are considered highly dissimilar to those of my invention.

BRIEF DESCRIPTION OF THE INVENTION

My invention comprises a rigid, substantially planar frame of substantial mass, including top, bottom and intermediate cross members and side members disposed in a plane, that is provided with a handle extending angularly upwardly from the top of the frame and is configured so as to present a rounded lower portion adjacent each end of the bottom cross member. The bottom cross member may be of serpentine configuration, extending upwardly and downwardly in an undulating fashion with the tops and bottoms of the undulations in a substantially straight line. The intermediate cross member, extending from one side to the other side of the frame, is disposed at a predetermined distance above the upper portions of the undulations. The spacing between the top of the bottom portion and the bottom of the intermediate member is somewhat less than the size of the largest particle of material contained in an aggregate.

My invention is particularly useful in connection with the fabrication of contemporary roofing structures for generally flat roofed buildings as will be described below.

It is an object of my invention to provide a rake for leveling aggregate materials disposed on a surface over a flexible membrane.

Another object of my invention to provide a rigid rake capable of displacing heavy aggregate materials without causing damage to a surface upon which the aggregate is disposed as the rake is moved over a surface and through the aggregate.

It is a further object of my invention to provide an aggregate leveling rake of improved efficiency of operation.

These and other objects and advantages will become apparent from a consideration of the following specification, claims and drawings in which;

DETAILED DESCRIPTION OF THE INVENTION

Figure 1:
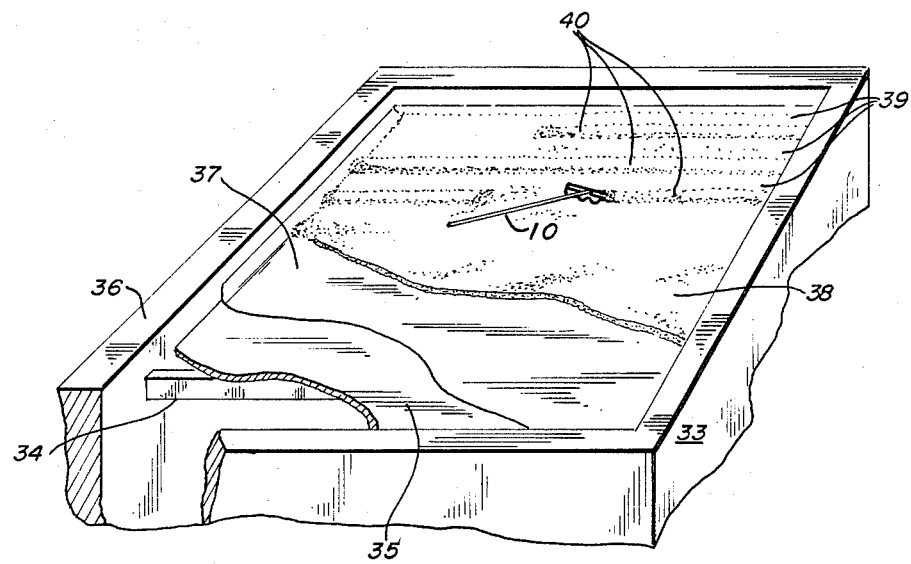
FIG. 1 is a partly broken away perspective sketch of a building structure of the flat roofed variety.
Figure 2:
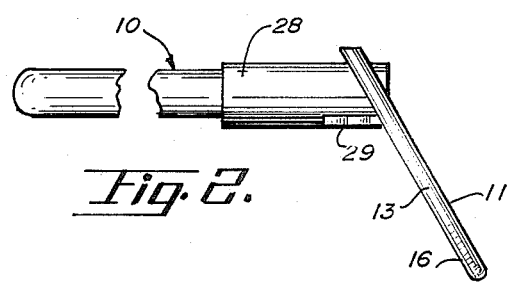
FIG. 2 is a side elevational view of a rake embodying the principles of my invention.

Referring now to the drawings in which like elements have been identified with like reference characters, an aggregate leveling rake is generally indicated by reference character 10 and includes a planar frame 11 having a top 12, a pair of sides 13 and 14, and a bottom 15 having ends 16 and 17 depending from side portions 13 and 14 respectively. Bottom 15 is comprised of a plurality of semi-circular portions extending downwardly as indicated by reference characters 18, 19, 20 and 21, and a lesser plurality of semi-circular portions extending upwardly and identified by reference characters 22, 23 and 24. An intermediate cross-member 25 extends generally horizontally from side 13 to side 14. A cylindrical handle receiving socket 28 is shown disposed at the center 26 of intermediate cross-member 25 and the center 27 of top 12 and is fastened in place by suitable means, such as welding or the like. Cylindrical handle socket 28 is reinforced and further held in place by web portions 29 and 30 connected to cylindrical handle socket 28 and to portions of intermediate cross-member 25 by suitable means, such as welding, etc. A handle 31 is received and held within cylindrical handle socket 28.

In one operative embodiment of my invention, successfully operative to level a gravel aggregate of ¾ to 1½ inch size, frame 11 was fashioned of ⅜ths inch steel rod configured to lie in a common plane after assembly of the individual parts as by welding or the like. The frame was approximately 18 inches wide and 5 inches high. The semi-circular portions were formed to a radius of approximately 1.25 inches and the intermediate cross-member 25 disposed approximately 2 inches below top 12 so that the spacing between intermediate cross-member 25 and the top portions of the upwardly extending semi-circles 22, 23 and 24 on bottom 15, was approximately 1 inch.

Figure 3:
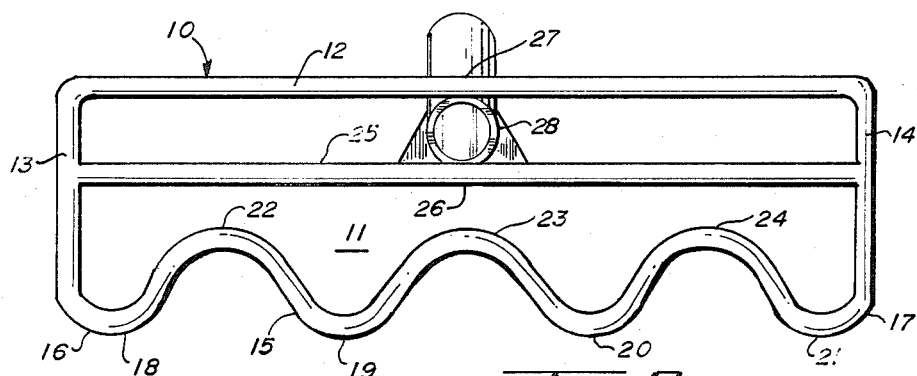
FIG. 3 is an end elevational view of the rake shown in FIG. 2.
Figure 4:
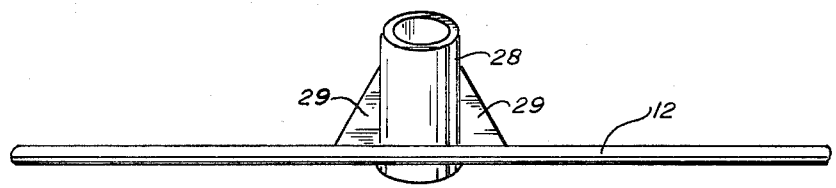
FIG. 4 is a top plan view thereof
Figure 5:
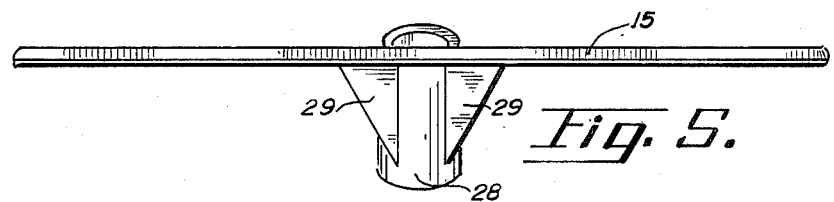
FIG. 5 is a bottom view thereof.
Figure 6:
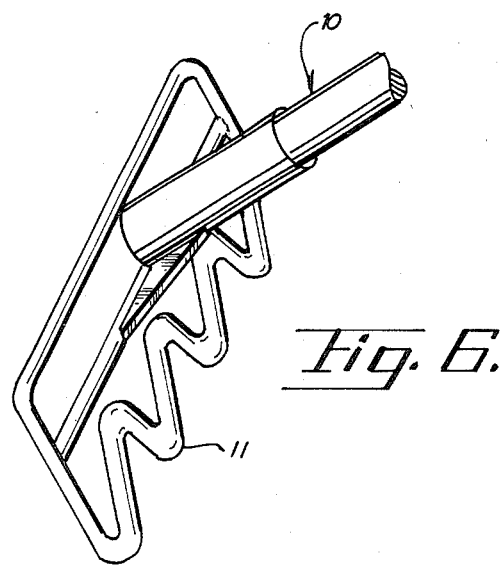
FIG. 6 is a side/top perspective view of an aggregate leveling rake illustrating my invention.
Figure 7:
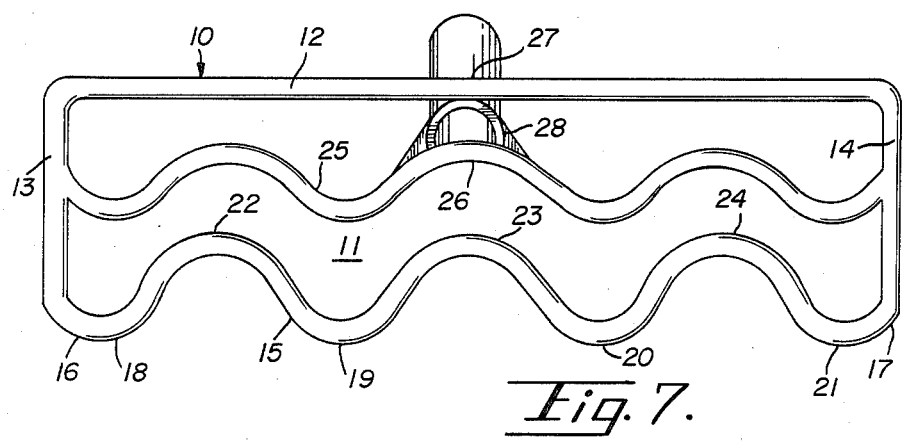
FIG. 7 is an end elevational view of a further embodiment of the subject matter of FIG. 3.

In the further embodiment of FIG. 7, intermediate member 25 is shown having a generally serpentine configuration, extending generally parallel to top 12, that is complementary to the shape illustrated for bottom 15 and is spaced therefrom a distance substantially the same as top portions 22, 23 and 24 are spaced from intermediate member 25 in FIG. 3 of the drawings.

Planar frame 11 and cylindrical handle socket 28 are preferably of substantial mass and rigidity so that frame 10 will tend to be submerged in and adjacent to a surface underneath a layer of aggregate material 38 and the downwardly extending semi-circular portions 18, 19, 20 and 21 will slide upon the surface underneath the aggregate material to thereby preserve the integrity of membrane 37 disposed on the surface.

As the rake is moved through and across a volume and area of the multi-sized aggregate 38 and 39, the aggregate material will flow through the upwardly and downwardly extending semi-circular portions of bottom 15 of rake 10 and the thickness of the layer of aggregate will be rendered level, the ultimate desired posture for an aggregate covered structure.

Referring to FIG. 1 of the drawings, a structure in the form of a building is indicated generally by reference character 33. Building 33 includes a plurality of laterally disposed joists 34 for supporting a roof-deck 35 intermediate the bounds of a peripherally extendent parapet 36. Deck 35 is preferably covered with a continuous rubber or plastic membrane 37 that forms an impervious barrier extending completely over the surface of the deck and vertically upwardly along the lower boundary of parapet 36. A quantity of suitable gravel, or stone, aggregate, 38, is intended to be disposed in a level layer of uniform thickness to maintain the continuous membrane in place so that it may withstand the onslaught of various and sundry environmental conditions.

In all known typical installations of weather-proof roofing materials which do use a top layer comprised of an aggregate, it is virtually impossible to apply the layer of aggregate material in a uniform thickness or in a level condition. In one common aggregate distribution arrangement, the aggregate is deposited in a plurality of parallel, overlapping rows of aggregate material distributed from a portable hopper of finite width. The rows are indicated by reference character 39 and the overlapping material is illustrated as a mound identified by reference character 40.

My novel and unobvious improvement provides a rake which is placed on the upper surface of the deposited aggregate material adjacent to or on a mound 40 and the rake, after immersion and submersion to contact with the upper surface of membrane 37, is caused to move back and forth and the aggregate material will flow through the rake as it moves back and forth to assume a level condition and thereby provide a level uniform layer of aggregate 38 over the entire surface of a roof as shown on the lower portion of FIG. 1.

It may be desirable to fabricate aggregate leveling rakes according to my invention for various sizes of particles contained in an aggregate. For example, the distance between the top portions 22, 23 and 24 of the bottom of the rake is generally less than the size of the largest particle of an aggregate. This is provided so that the aggregate will flow through the rake as the rake is moved relative to a volume of aggregate without substantially blocking the flow of the aggregate and so that the flow of the aggregate may proceed downwardly on either side of the top portions 22, 23 and 24 of bottom 15 and thereby is displaced laterally as leveling occurs.

I claim:

1. An aggregate leveling rake comprising in combination;
   a flat, rigid, planar frame comprised of a continuous peripheral member having top and side portions, means for distributing and leveling a layer of aggregate comprising a rounded configuration on the bottom adjacent the lower sides and an intermediate member disposed generally parallel to the top and extending intermediate the sides; and
   a handle-receiving socket connected to the center portions of said top and intermediate members and extending perpendicularly thereto and angularly upwardly with respect to the plane of said frame.

2. The apparatus of claim 1 in which the bottom is comprised of upwardly and downwardly extending portions disposed and interconnected intermediate the rounded ends.

3. The apparatus of claim 2 in which the bottom is of a serpentine configuration.

4. The apparatus of claim 2 in which the intermediate member is of a straight configuration.

5. The apparatus of claim 2 in which the intermediate member is generally complementary in configuration to the shape of the bottom.

6. The apparatus of claim 2 in which the intermediate member is spaced above the tops of the upwardly extending portions of the bottom at a distance slightly less than or substantially equal to the size of the largest aggregate particle.

7. The apparatus of claim 3 in which the intermediate member is spaced above the tops of the upwardly extending portions of the bottom at a distance slightly less than or substantially equal to the size of the largest aggregate particle.

8. The apparatus of claim 5 in which the intermediate member is spaced above the bottom at a distance slightly less than or substantially equal to the size of the largest aggregate particle.

* * * * *